US012112902B1

(12) United States Patent
Miyata et al.

(10) Patent No.: US 12,112,902 B1
(45) Date of Patent: Oct. 8, 2024

(54) PUSH BUTTON SWITCH

(71) Applicant: Mik Electronic Corporation, Tokyo (JP)

(72) Inventors: Munechika Miyata, Tokyo (JP); Kota Ishii, Tokyo (JP)

(73) Assignee: MIK ELECTRONIC CORPORATION, Tokyo (JP)

(*) Notice: Subject to any disclaimer, the term of this patent is extended or adjusted under 35 U.S.C. 154(b) by 0 days.

(21) Appl. No.: 18/290,800

(22) PCT Filed: Aug. 17, 2023

(86) PCT No.: PCT/JP2023/029729
§ 371 (c)(1),
(2) Date: Jan. 21, 2024

(51) Int. Cl.
*H01H 13/20* (2006.01)
*H01H 13/52* (2006.01)
*H01H 13/64* (2006.01)

(52) U.S. Cl.
CPC ............ *H01H 13/64* (2013.01); *H01H 13/20* (2013.01); *H01H 13/52* (2013.01)

(58) Field of Classification Search
CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20
See application file for complete search history.

(56) References Cited

U.S. PATENT DOCUMENTS

| | | | | |
|---|---|---|---|---|
| 4,812,603 | A | 3/1989 | Coleman | |
| 6,288,352 | B1 | 9/2001 | Fukui et al. | |
| 2009/0229958 | A1 | 9/2009 | Koizumi et al. | |
| 2014/0190812 | A1* | 7/2014 | Yamanaka | H01H 19/11 200/529 |

(Continued)

FOREIGN PATENT DOCUMENTS

| | | | |
|---|---|---|---|
| CA | 2655702 | A1 | 9/2009 |
| CN | 101533730 | A | 9/2009 |

(Continued)

OTHER PUBLICATIONS

Japan Patent Office (ISA/JP), PCT International Search Report for PCT/JP2023/029729 mailed on Sep. 26, 2023.

(Continued)

*Primary Examiner* — Ahmed M Saeed
(74) *Attorney, Agent, or Firm* — Bridgeway IP Law Group, PLLC; Sang Ho Lee; Hyun Woo Shin

(57) ABSTRACT

A push button switch (1) includes: a base (30) having a plurality of terminals arranged separately from each other on a same circumference; a movable contact brush (50) having a plurality of contact portions arranged on the plurality of terminals; a rotor (90) having cams that bring the plurality of contact portions into contact with or separate from the plurality of terminals, and is supported to be capable of rotating about an axis of the base (30); an actuator (70) that abuts against a gear provided on the rotor (90) and moves in a direction orthogonal to the axis of the base (30) to rotate the rotor (90); and a button (60) that abuts against the actuator (70), moves the actuator (70) by a press-in operation, and restores elastically by a spring force.

2 Claims, 13 Drawing Sheets

(56) References Cited

U.S. PATENT DOCUMENTS

| | | | | |
|---|---|---|---|---|
| 2014/0202842 A1* | 7/2014 | Abe | ........................ | H01H 13/58 200/529 |
| 2019/0348234 A1* | 11/2019 | Wu | ........................ | H01H 13/28 |

FOREIGN PATENT DOCUMENTS

| | | | |
|---|---|---|---|
| CN | 103915280 | A | 7/2014 |
| CN | 113035617 | B | 8/2022 |
| EP | 2101339 | A2 | 9/2009 |
| EP | 2752865 | A1 | 7/2014 |
| JP | 58-101438 | U | 7/1983 |
| JP | 2000-182477 | A | 6/2000 |
| JP | 2009-218100 | A | 9/2009 |
| JP | 2016-122576 | A | 7/2016 |
| JP | 2017-073215 | A | 4/2017 |
| KR | 10-2009-0097789 | A | 9/2009 |

OTHER PUBLICATIONS

Japan Patent Office (ISA/JP), PCT Written Opinion of the International Searching Authority for PCT/JP2023/029729 mailed on Sep. 26, 2023.

* cited by examiner

PUSH BUTTON SWITCH

TECHNICAL FIELD

The present application relates to a push button switch suitable as a switch for operating, for example, a seat heater of an automobile.

BACKGROUND

Heretofore, a seesaw switch described in Patent Document 1 below has been known as this type of switch. The seesaw switch comprises a locking mechanism which enables switching between a conductive state and a non-conductive state and maintaining the state by tipping a knob supported by a case so that a contact portion of a movable contact inside the case contacts to or separates from a terminal. According to the switch, if the left end portion of the operation body provided in the upper portion of the case is pressed, then the power supply Vcc conducts with the contact A, and the conductive state (HIGH setting) is locked. On the other hand, if the right end portion of the operation body is pressed, then the conduction of the contact A is released, the power supply Vcc conducts with the contact B, and the conductive state (LOW setting) is locked.

PRIOR ART DOCUMENT

Patent Document

Patent Document 1: Japanese Patent Application Laid-Open 2017-073215

SUMMARY

Technical Problem

According to the previous seesaw switch, for example, in the case of switching the circuit from a HIGH setting to a LOW setting, it is necessary to press the right end portion of the operation body to release the locked state and temporarily switch the power supply to the OFF state. Furthermore, the right end portion of the actuator must be pressed again to turn the power supply to the ON state before locking it, and there is a problem that the operation to release the lock is troublesome. In addition, since there are only two types of circuit switching namely HIGH setting and LOW setting, there is also a problem that it cannot be applied to a seat heater with a fine temperature setting such as a MID setting.

Therefore, the present invention is made to solve such a problem, and an object thereof is to provide a push button switch that is able to switch circuit by a simple operation, and also able to cope with the switching of a plurality of circuits.

Technical Solution

In order to achieve the purpose, the push button switch of the present invention is characterized by comprising: a base having a plurality of terminals arranged separately from each other on a same circumference; a movable contact brush having a plurality of contact portions arranged on the plurality of terminals; a rotor having cams that bring the plurality of contact portions into contact with or separate from the plurality of terminals, and is supported to be capable of rotating about an axis of the base; an actuator that abuts against a gear provided on the rotor and moves in a direction orthogonal to the axis of the base to rotate the rotor; and a button that abuts against the actuator, moves the actuator by a press-in operation, and restores elastically by a spring force.

In addition, the push button switch of the present invention is characterized in that, a mechanism for rotating the rotor by the actuator is configured to include: an upper side protrusion and a lower side protrusion arranged opposite to each other in the actuator; and an upper gear and a lower gear which are laminated in upper and lower two segments in the rotor, and abutted against by the upper side protrusion and the lower side protrusion respectively, wherein the rotation radii of the upper gear and the lower gear are different, and gear teeth of the upper gear and the lower gear are arranged at positions displaced from each other in the direction of rotation.

In addition, the push button switch of the present invention is characterized in that, a mechanism for elastically restoring the button is configured to include: an inclined surface that is arranged in the base; and a spring holder that accommodates a coil spring compressed by the actuator and is pressed against the inclined surface by its rebound force.

Technical Effect

According to the push button switch of the present invention, there is the effect of being able to switch circuit by a simple operation, and also being able to cope with the switching of a plurality of circuits by adopting the structure described herein.

BRIEF DESCRIPTION OF DRAWINGS

FIG. 11 is an explanatory view showing the rotation action of the rotor when the button in the switch is pressed in.

DETAILED DESCRIPTION

In the following, reference to the drawings will be made to explain the way of implementing the present invention.

Figure 1:
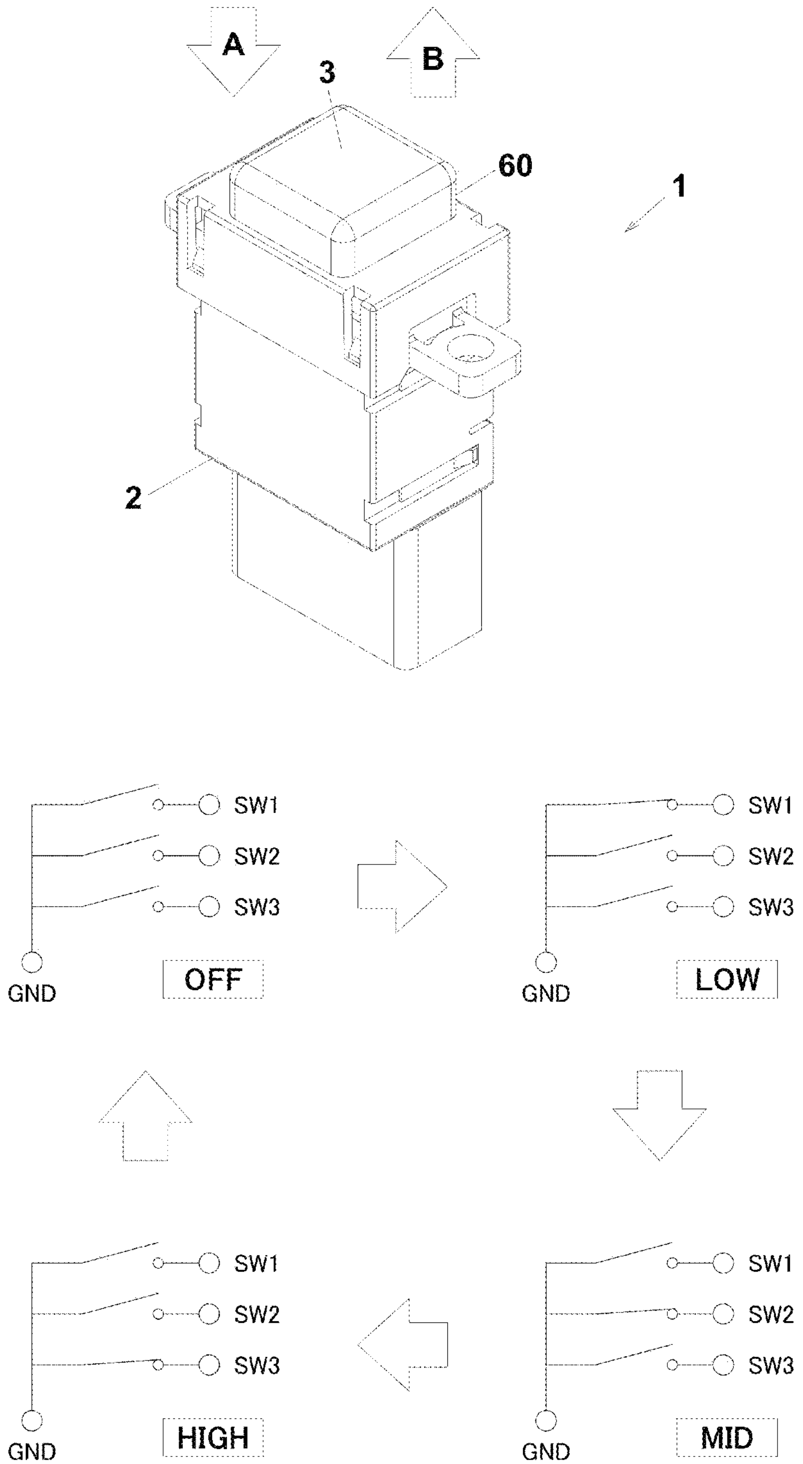
FIG. 1 is a perspective view showing the appearance of a push button switch of the present invention.

As shown in FIG. 1, the push button switch 1 of the present embodiment is applied as a switch for operating a seat heater of an automobile. The push button switch 1 is an auto-return type switch which a button 60 sinks in the direction of the arrow A by pressing an operation body 3 provided on the upper portion of a case 2 with a finger, and the button 60 will automatically return in the direction of the arrow B when the finger releases. As shown in the circuit diagram, the internal circuit is configured to switch in the order of OFF (stop)→LOW (weak: SW1 is ON)→MID (medium: SW2 is ON)→HIGH (strong: SW3 is ON)→OFF (stop) each time the operation body 3 is pressed.

Figure 2:
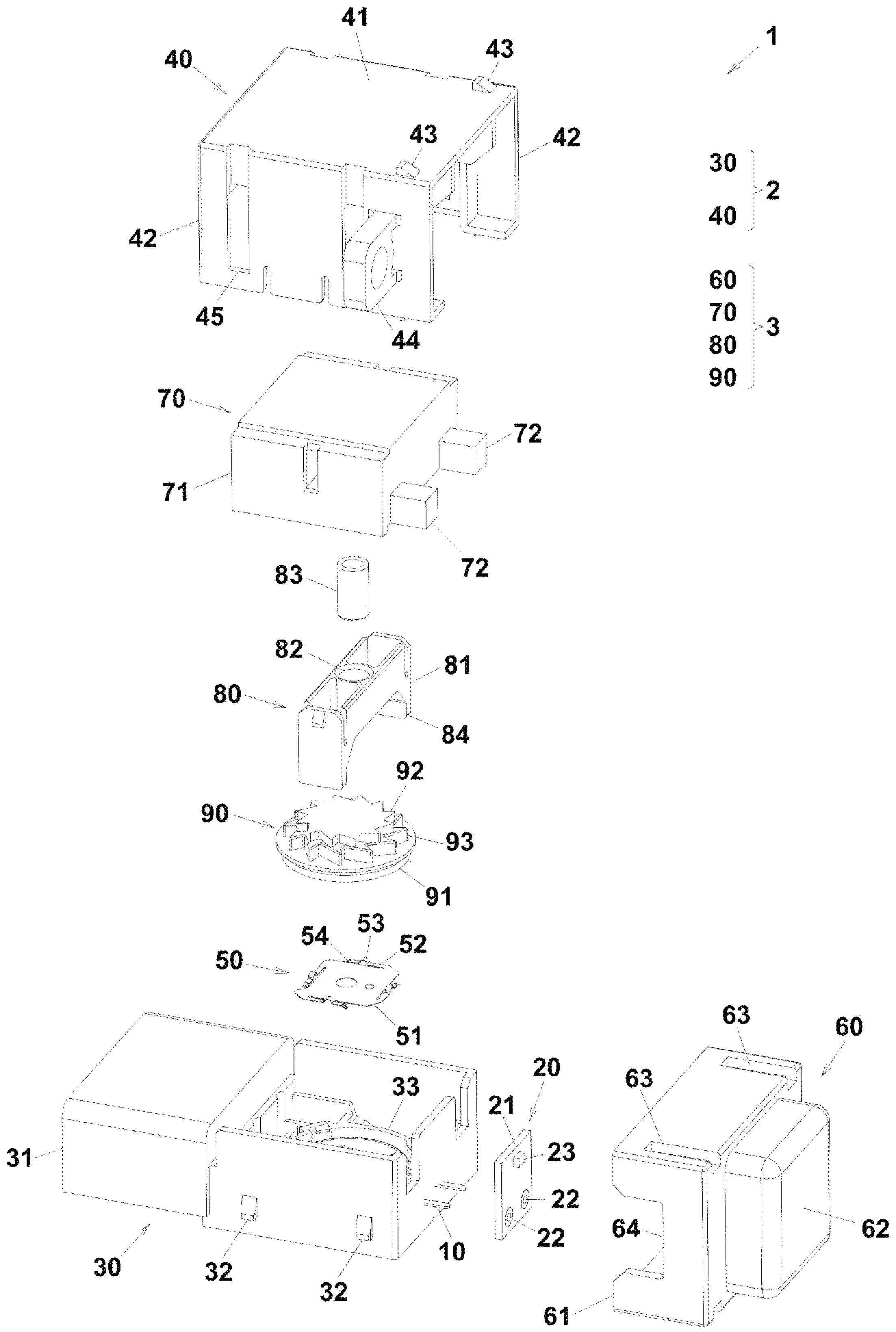
FIG. 2 is an exploded perspective view showing the internal structure of the switch.

As shown in FIG. 2, the push button switch 1 of the present embodiment has a configuration that a movable contact brush 50 is accommodated inside the case 2 in which a top shell 40 covers over the base 30, and the operation body 3 consisting of the button 60, an actuator 70, a spring holder 80 and a rotor 90 for activating the movable contact brush 50, is provided. Hereinafter, the detailed configuration of the push button switch 1 will be described per individual components.

Figure 3:
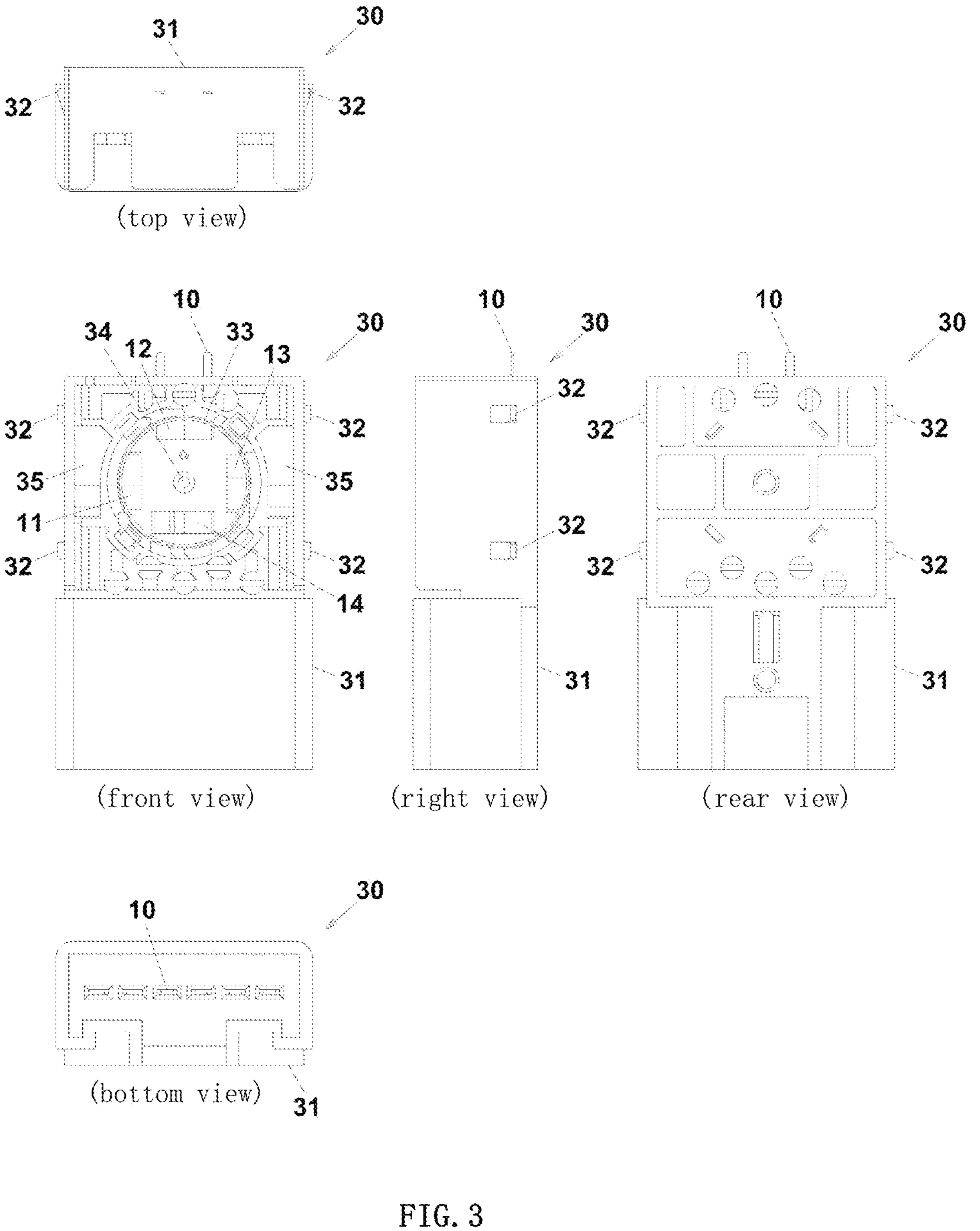
FIG. 3 is a plan view showing the structure of a base that constitutes the switch.

The base 30 shown in FIG. 3 is composed of resin material having insulating property, and locking claws 32, 32, . . . for mounting the top case 40 are formed on the outer wall surface of a square box-shaped base body 31. A circular base 33 for accommodating the movable contact brush 50 (refer to FIG. 5) and the rotor 90 (refer to FIG. 9) is provided in the interior of the base body 31. A shaft portion 34, which supports the rotor 90 to be capable of rotating about the axis, is provided at the center of the circular base 33, and inclined surfaces 35, 35, with which the spring holder 80 (refer to FIG. 8) contacts while moving, are provided on the left and right sides of the circular base 33. On the bottom surface of the circular base 33, a fixed contact pattern 10 is insert-molded by punching a metal plate having conductivity. At the fixed contact pattern 10, a first switch terminal 11, a second switch terminal 12, a third switch terminal 13, and a ground terminal 14 are arranged separately from each other at intervals of 90-degree on the same circumference of the circular base 33. It should be noted that a print substrate 20 (refer to FIG. 2) is mounted on the upper surface of the base 30, and an LED 22 which is the switch's display lamp and a resistor 23 are mounted on the substrate 21.

Figure 4:
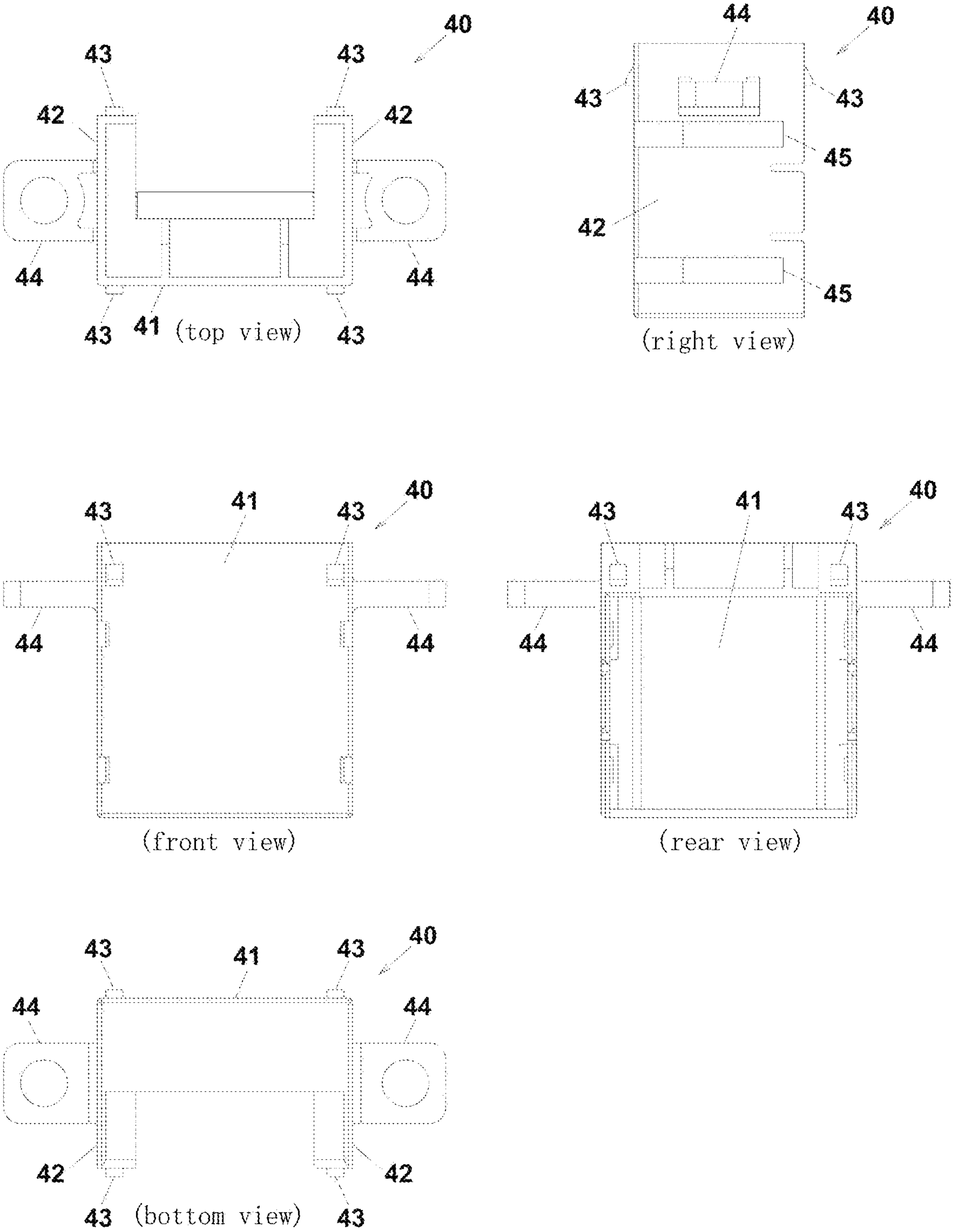
FIG. 4 is a plan view showing the structure of a top case that constitutes the switch.

The top case 40 shown in FIG. 4 is composed of resin material having insulating property, and is formed into a "コ" shaped cross section comprising a top plate 41 covering the base 30 and side plates 42, 42 on the left and right sides. Locking claws 43, 43 . . . for mounting the button 60 are formed on the upper surface of the top plate 41 and the bottom surface of the side plate 42. On the upper left and right sides of the side plate 42, mounting pieces 44, 44 are provided for mounting the push button switch 1 inside the car, and two columns of locking holes 45, 45 are formed on the left and right side surfaces of the side plate 42. By locking the locking claws 32, 32 into the locking holes 45, 45, the top case 40 is mounted on the base 30, and the case 2 for accommodating components is formed.

Figure 5:
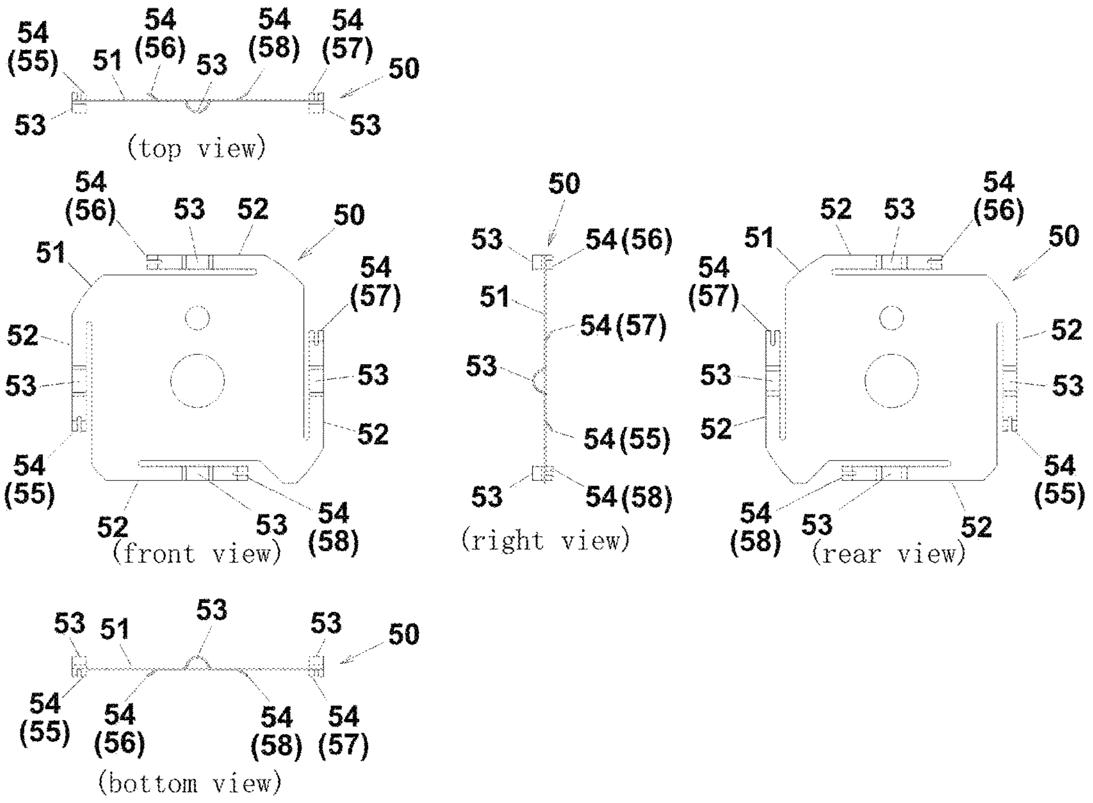
FIG. 5 is a plan view showing the structure of a moveable contact brush that constitutes the switch.

The movable contact brush 50 shown in FIG. 5 is composed of a metal plate 51 having conductivity, and 4 leaf spring pieces 52, 52 . . . are formed by notching respective sides of the square-shaped metal plate 51. Bending portions 53, 53 . . . , which are bent upward in a bending shape, is provided at the middle position of respective leaf spring pieces 52. At the front end of respective leaf spring pieces 52, contact portions 54, 54, . . . branching into two strands and bending at an obtuse angle, are provided to prevent poor contact. A total of 4 contact portions 54 are assigned clockwise as a first switch contact portion 55, a second switch contact portion 56, a third switch contact portion 57, and a ground contact portion 58.

Figure 6:
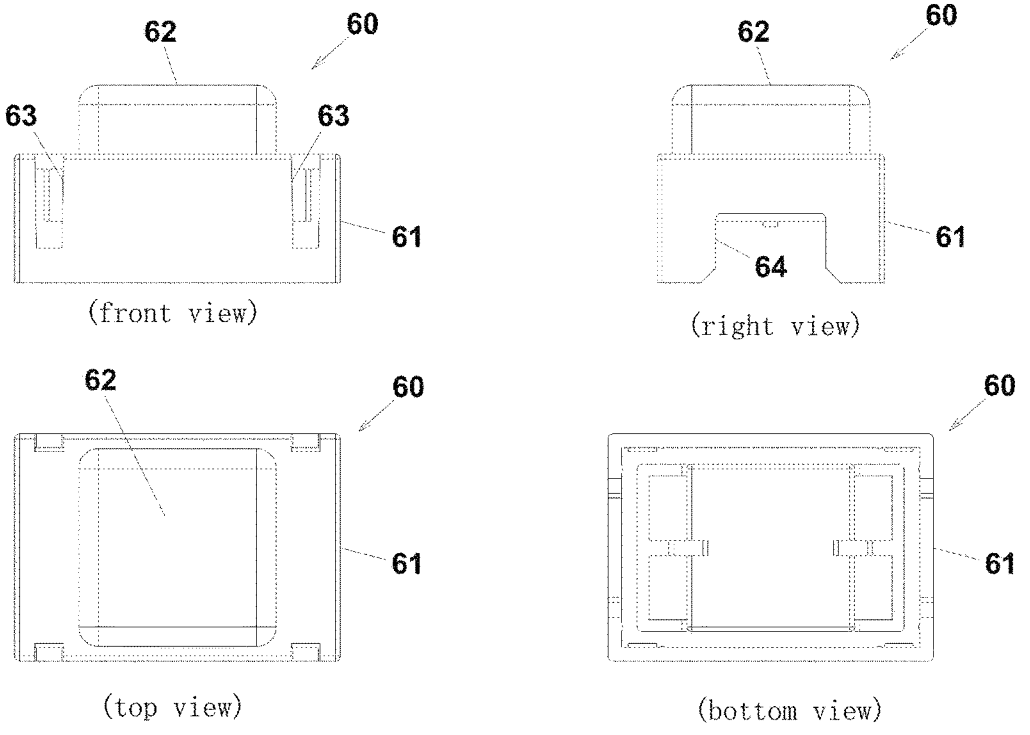
FIG. 6 is a plan view showing the structure of a button that constitutes the switch.

The button 60 shown in FIG. 6 is composed of resin material having insulating property, and comprises a square box-shaped button body 61 covering the case 2 and a flat rectangular shaped operation portion 62 protruding from the upper surface of the button body 61. At the button body 61, two columns of locking holes 63, 63 are provided on the front and rear surface, and concave portions 64, 64 are provided on the left and right side surfaces to avoid the mounting pieces 44, 44.

Figure 7:
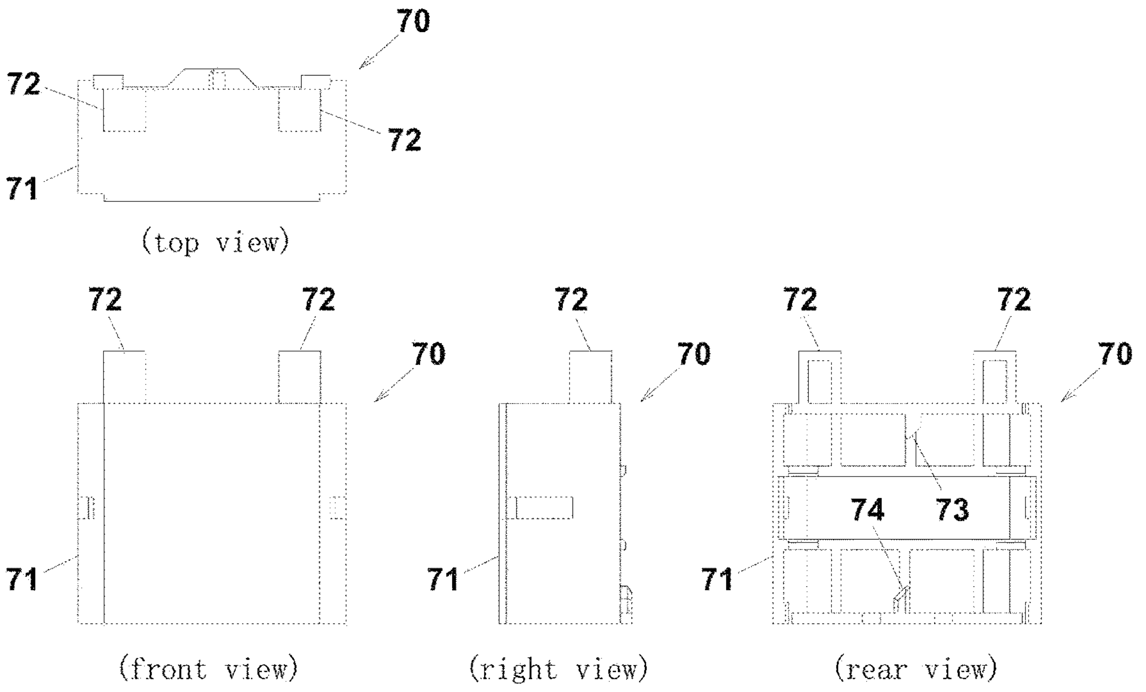
FIG. 7 is a plan view showing the structure of an actuator that constitutes the switch.

The actuator 70 shown in FIG. 7 is composed of resin material having insulating property, and is provided with a pair of convex portions 72, 72 for mounting the button 60 on the upper surface of a flat box-shaped actuator body 71. On the rear surface of the actuator body 71, an upper side protrusion 73 and a lower side protrusion 74 having an acute tip are provided as a mechanism for rotating the rotor 90 (refer to FIG. 9). The upper side protrusion 73 and the lower side protrusion 74 are arranged at a position 180-degree opposite to each other and reciprocate in a direction orthogonal to the axis of the shaft portion 34.

Figure 8:
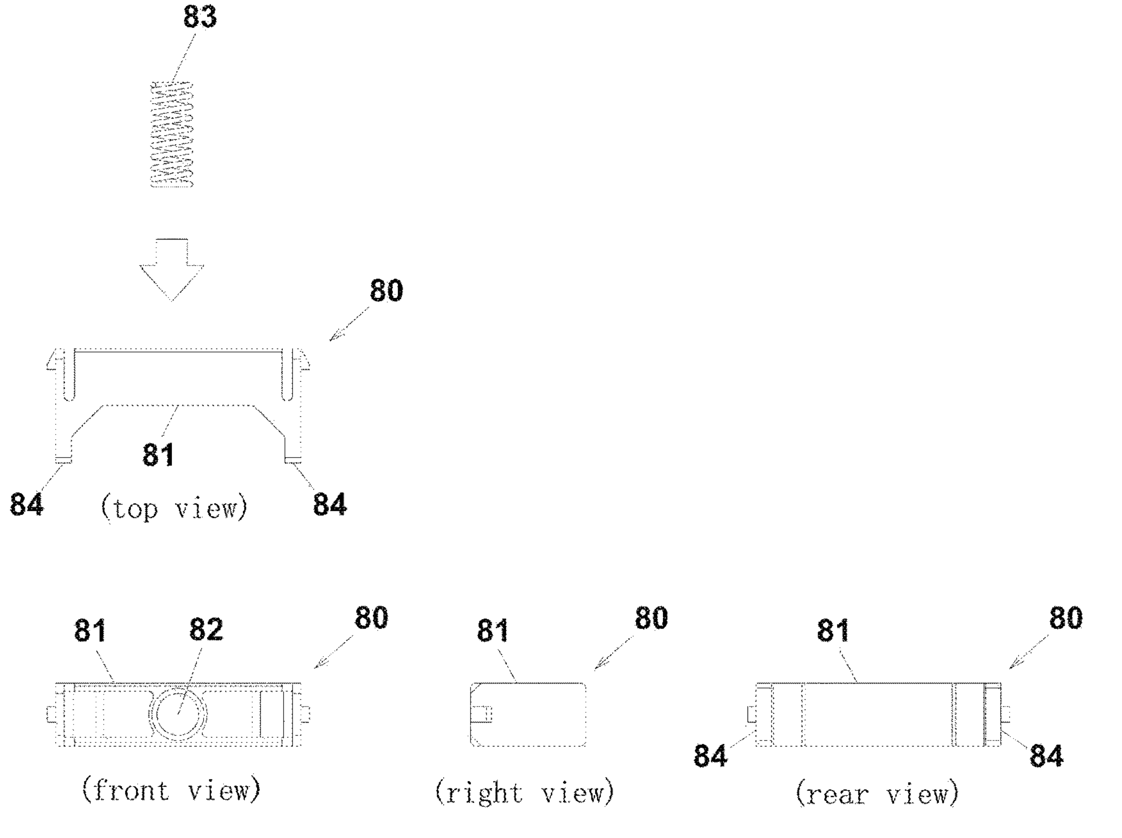
FIG. 8 is a plan view showing the structure of a spring holder that constitutes the switch.

The spring holder 80 shown in FIG. 8 is composed of resin material having insulating property, and as a mechanism for elastically restoring the button 60, a cylindrical accommodating portion 82 is provided on the upper surface of the flat box-type holder body 81, and a coil spring 83, in which a metal wire is spirally wounded, is accommodated in the accommodating portion 82. Click pieces 84, 84 are formed on the bottom surface of the holder body 81 for providing a clicking sensation when the button 60 is pressed in and automatically restores.

Figure 9:
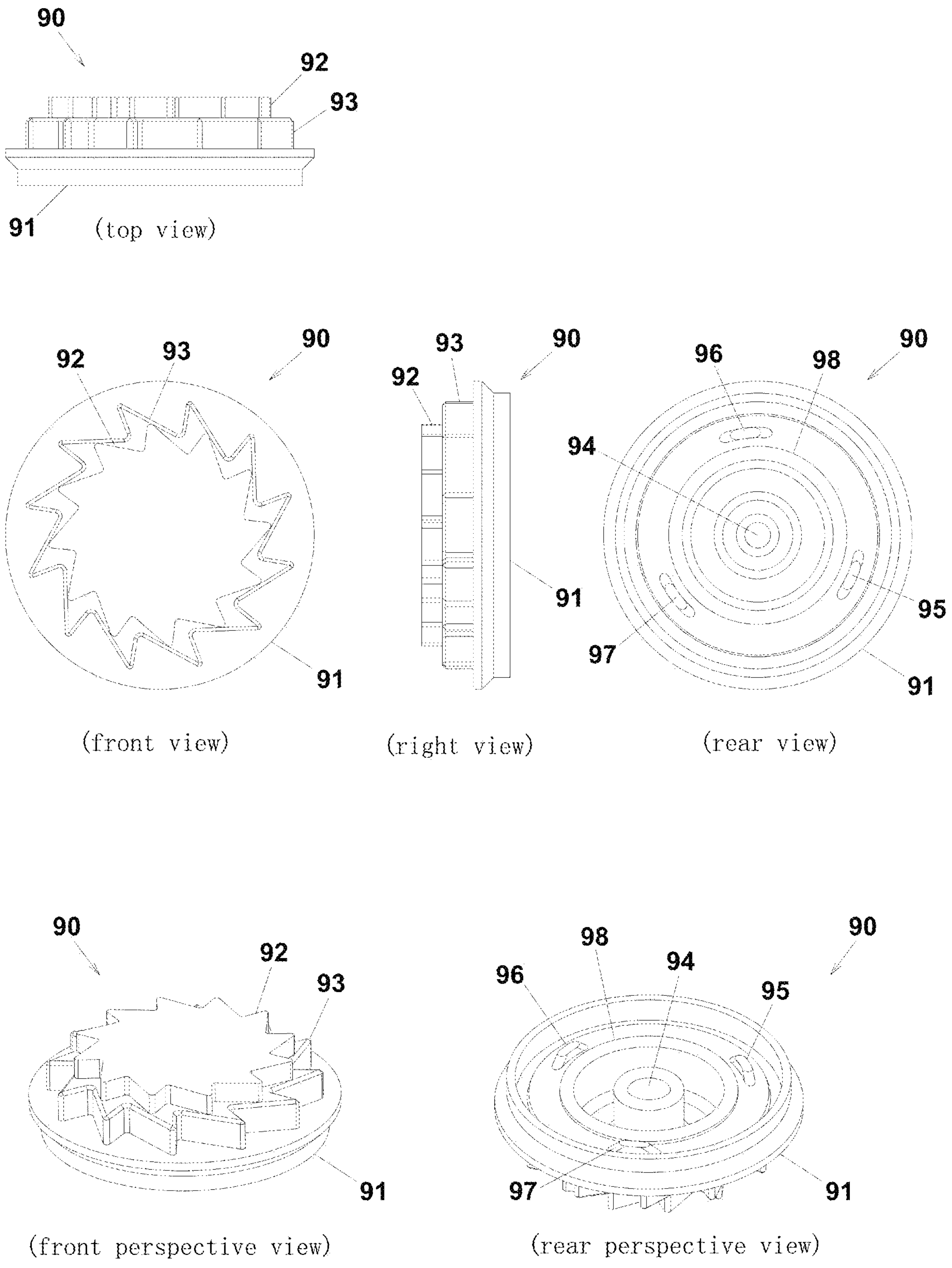
FIG. 9 is a plan view showing the structure of a rotor that constitutes the switch.

The rotor 90 shown in FIG. 9 is composed of resin material having insulating property, and an upper gear 92 and a lower gear 93 stacked in upper and lower two segments are provided on the front side of a disc-shaped rotor body 91. In the present embodiment, the upper gear 92 is set to a number of teeth 12, a pressure angle of 18 degrees, the lower gear 93 is set to a number of teeth 12, a pressure angle of 12 degrees. In addition, the upper gear 92 and the lower gear 93 have a structure in which the radii of rotation are different and the gear teeth are arranged at positions displaced from each other by a predetermined angle in the circumferential direction (rotation direction). A cylindrical bearing 94 embedded by the shaft portion 34 of the base 30 is provided at the center of the back side of the rotor body 91. On the same outer circumference centered on the bearing 94, 3 circular arc cams 95, 96, 97 are protrudingly formed at equal intervals to enable contacting with the first switch contact portion 55, the second switch contact portion 56 and the third switch contact portion 57 within a predetermined range. On the inner circumference centered on the bearing 94, a circular arc cam 98 is continuously and protrudingly formed to enable constant contacting with the ground contact portion 58.

Figure 10:
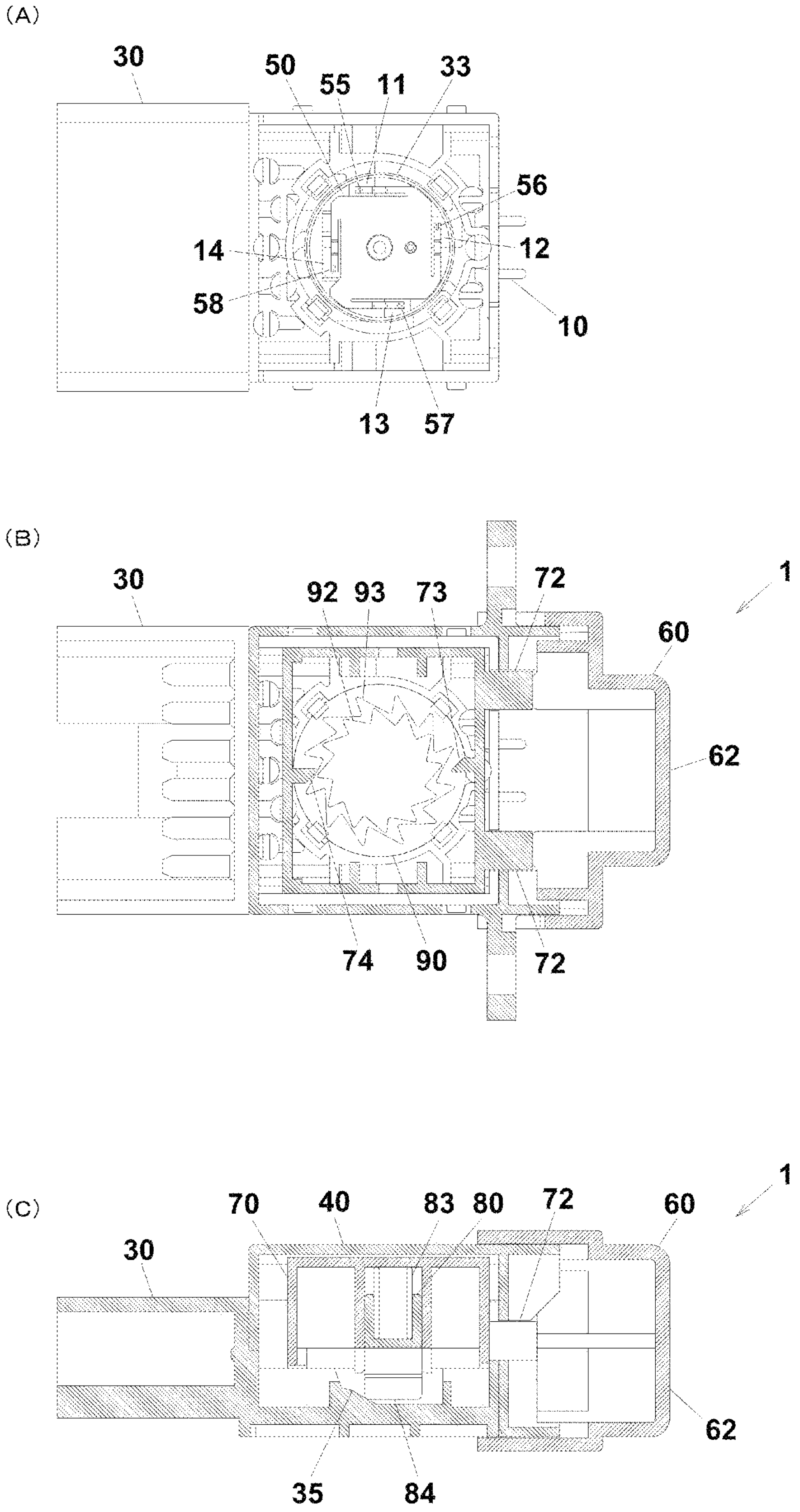
FIG. 10 is a sectional view showing a state of the switch when assembled.

The components that constitute the push button switch 1 are described above, but when assembled, first of all, as shown in FIG. 10 (A), the movable contact brush 50 is placed on the circular base 33 of the base 30, whereby the first switch contact portion 55, the second switch contact portion 56, and the third switch contact portion 57 are respectively configured in a non-contact state on the first switch terminal 11, the second switch terminal 12, and the third switch terminal 13 of the fixed contact pattern 10. Next, as shown in FIG. 10 (B), by covering the movable contact brush 50 from above using the rotor 90, the bearing 94 of the rotor 90 (refer to FIG. 9) is embedded with the shaft portion 34 of the base 30 (refer to FIG. 3). Furthermore, as shown in FIG. 10 (C), the spring holder 80 accommodating the coil spring 83 is mounted to the actuator 70, and the actuator 70 is placed on the base 30, from which the top case 40 covers and is mounted. Finally, the button 60 is fixed to the actuator 70 and the locking claw 43 of the top case 40 (refer to FIG. 4) is embedded into the locking hole 63 of the button 60 (refer to FIG. 6) to mount the button 60 on the top case 40.

In this way, the operation body 3 comprising the button 60, the actuator 70, the spring holder 80, and the rotor 90 is formed so that, if the operation body 3 of the push button switch 1 is pressed with a finger, then the button 60 will sink, and the rotor 90 pressed by the actuator 70 will rotate at a predetermined angle centered on the shaft portion 34 of the base 30, causing the movable contact brush 50 to act and switch the contact. On the other hand, if the force for pressing the button 60 is released by releasing the finger from the operation body 3, then the button 60 will restore elastically by the spring force of the coil spring 83 accommodated in the spring holder 80.

Figure 11:
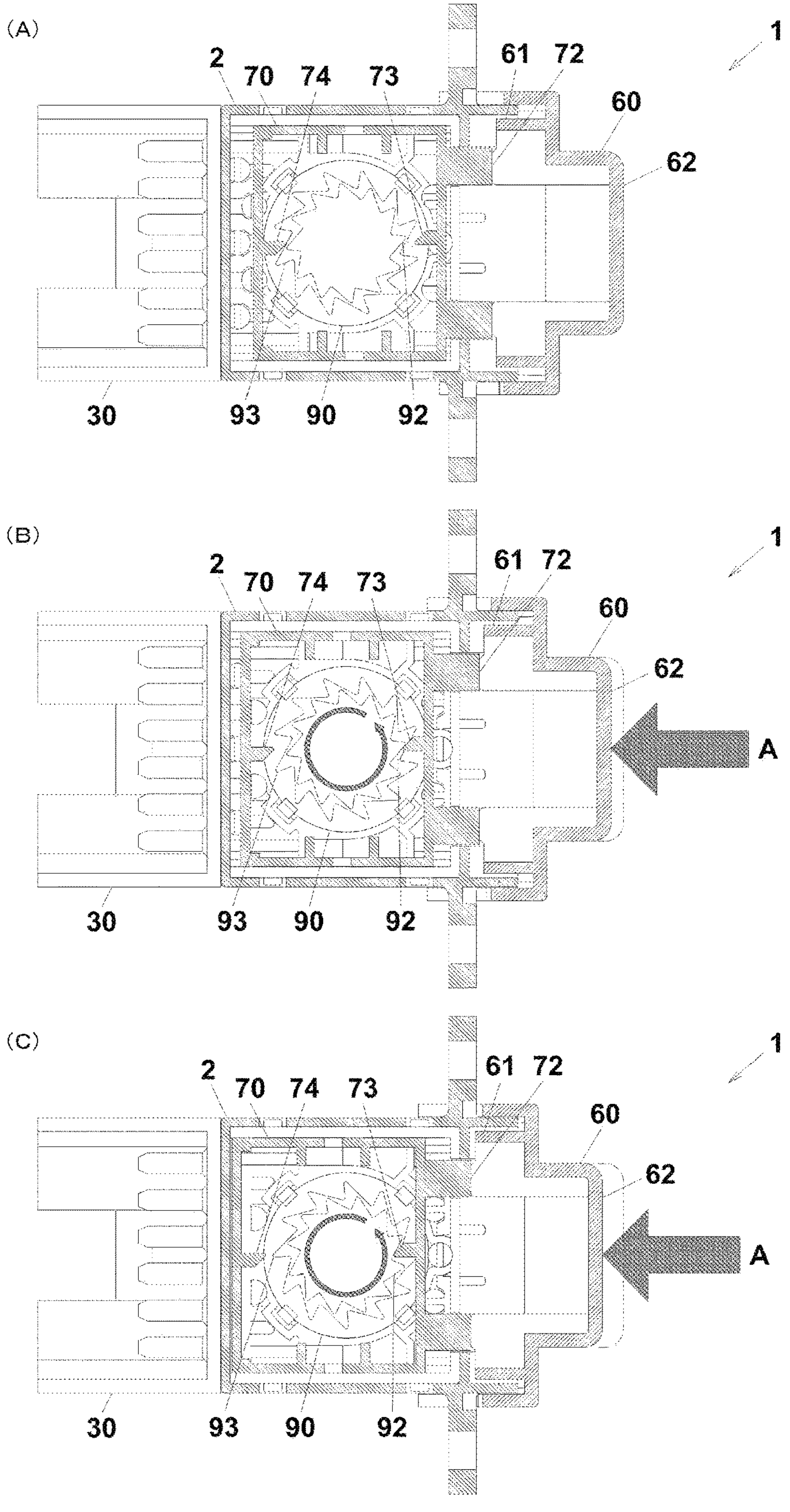

The configuration of the push button switch 1 of the present embodiment is described above, next, the rotation action of the rotor 90 based on the operation of the button 60 will be described. FIG. 11 (A) shows the state of the interior of the case 2 when the button 60 is in a free position. At this time, the lower side protrusion 74 of the actuator 70 is in contact with the lower gear 93 of the rotor 90, but the upper side protrusion 73 isn't in contact with the upper gear 92. Here, as shown in FIG. 11 (B), if the operation portion 62 of the button 60 is pressed in the direction of the arrow A, then the convex portion 72 which is in contact with the button body 61 will be pressed to cause the actuator 70 to move in the direction orthogonal to the axis, and the upper side protrusion 73 will collide with the upper gear 92 thereby the rotor 90 starts to rotate counterclockwise. Also, as shown in FIG. 11 (C), if the operation portion 62 of the button 60 is further pressed in the direction of the arrow A, then the upper side protrusion 73 will further rotate the rotor 90 while contacting the upper gear 92. At this time, since the actuator 70 remains in a state of moving, the lower gear 93 of the rotor 90 is not in contact with the lower side protrusion 74 during rotation.

Figure 12:
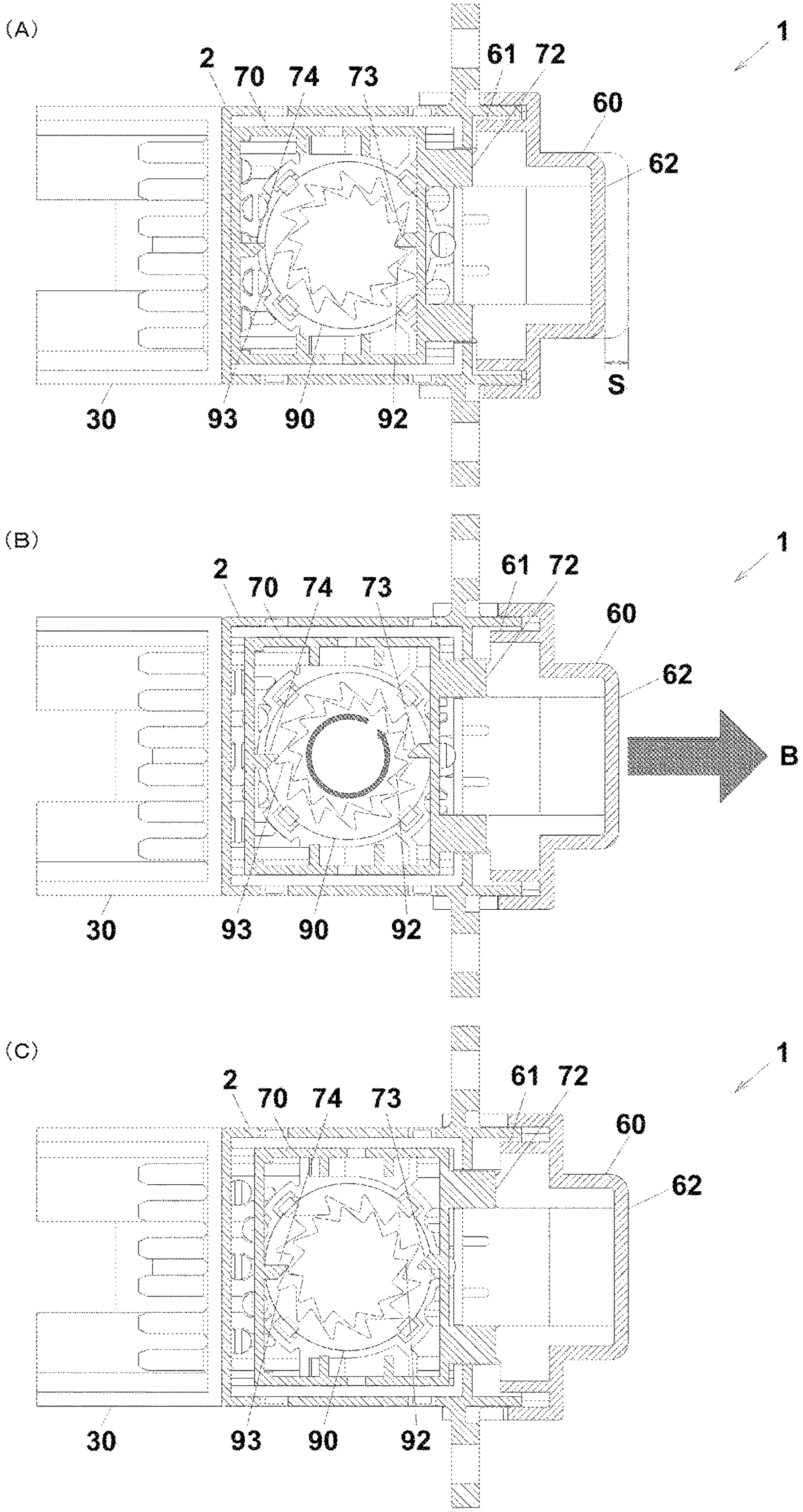
FIG. 12 is an explanatory view showing the rotation action of the rotor when the button in the switch automatically restores.

FIG. 12 (A) shows the state of the interior of the case 2 when the button 60 has moved in a full stroke (S in figure). At this time, since the rotor 90 rotates until the upper side protrusion 73 comes into contact with the tooth root of the upper gear 92, the rotor 90 rotates the pressure angle (18 degrees) of the upper gear 92 from the free position in the FIG. 11 (A). Here, if the force for pressing the button 60 is released, then the button 60 will automatically restore by the spring force of the coil spring 83. At this time, as shown in FIG. 12 (B), the actuator 70 pushes the button 60 upwards in the direction of the arrow B, and the lower side protrusion 74 will collide with the lower gear 93 thereby the rotor 90 starts to rotate counterclockwise. Then, as shown in FIG. 12 (C), if the button 60 returns to the free position, the rotor 90 will rotate the pressure angle (12 degrees) of the lower gear 93 from the full stroke position of FIG. 12 (A). That is, every time the button 60 is pressed, the rotor 90 rotates 18 degrees until the button 60 moves to the full stroke position and rotates 12 degrees until the button 60 returns to the free position for a total of 30 degrees.

Figure 13:
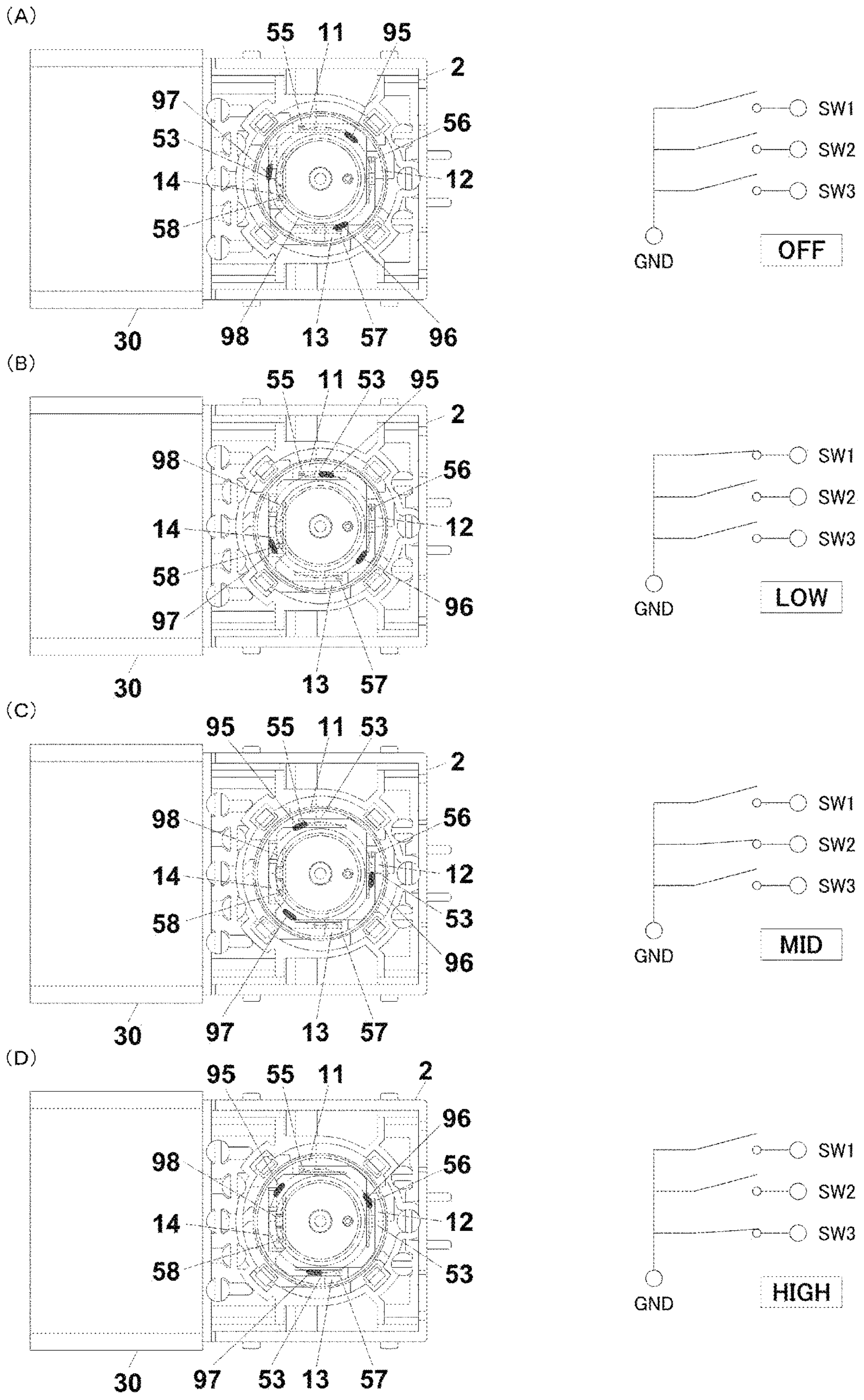
FIG. 13 is an explanatory view showing the state of the circuit accompanying the rotation action of the rotor in the switch.
Figure 14:
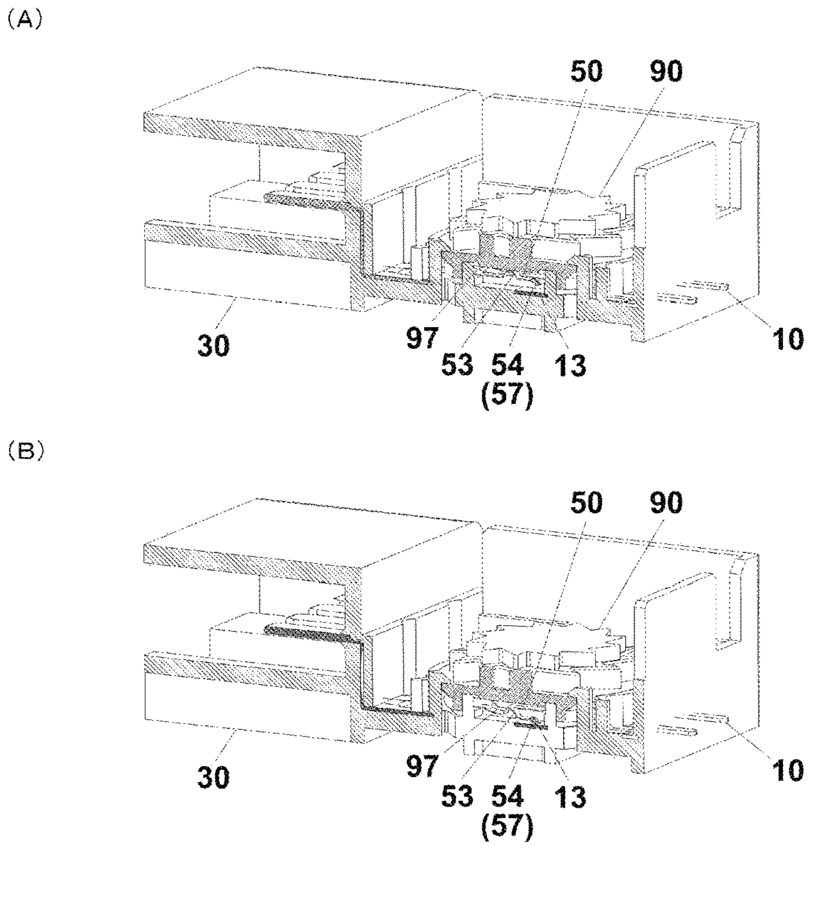
FIG. 14 is an explanatory view showing the contact state between a contact portion and a terminal in the switch.

Next, the switching of the circuit accompanying the rotation action of the rotor 90 will be described. In FIG. 13, in order to facilitate understanding the position relationship of the contacts, illustrations of the top case 40, the button 60, and the actuator 70 are omitted, and the positions of the circular arc cams 95, 96, 97 on the rear side of the rotor 90 are represented by shading. FIG. 13 (A) shows a state of the interior of the case 2 when the button 60 is in the free position. At this time, the circular arc cam 98 of the rotor 90 always presses the bending portion 53 of the movable contact brush 50, and the pressed ground contact portion 58 always comes into contact with the ground terminal 14. In contrast, since the bending portion 53 of the movable contact brush 50 is not pressed by any one of the 3 circular arc cams 95, 96, 97, the first switch contact portion 55, the second switch contact portion 56, and the third switch contact portion 57 are all separated from the first switch terminal 11, the second switch terminal 12, and the third switch terminal 13 and are not in contact (refer to FIG. 14 (A)). This is the state in which circuit is OFF.

Here, if the button 60 is pressed once, then the rotor 90 will rotate counterclockwise by 30 degrees as shown in FIG. 12, therefore the cam position will also rotate by 30 degrees to move. In this way, as shown in FIG. 13 (B), a circular arc cam 95 presses the bending portion 53 of the movable contact brush 50, and the pressed first switch contact portion 55 comes into contact with the first switch terminal 11. At this time, the ground contact portion 58 is always in contact with the ground terminal 14, but neither the second switch contact portion 56 nor the third switch contact portion 57 is in contact with the second switch terminal 12 and the third switch terminal 13. This is the state in which SW1 is ON.

Here, if the button 60 is pressed once again, then the rotor 90 will further rotate counterclockwise by 30 degrees, and the cam position will also further rotate by 30 degrees to move. In this way, as shown in FIG. 13 (C), the contacting circular arc cam 95 separates from the bending portion 53, the next circular arc cam 96 presses the bending portion 53, and the pressed second switch contact portion 56 comes into contact with the second switch terminal 12. At this time, the ground contact portion 58 is always in contact with the ground terminal 14, but neither the first switch contact portion 55 nor the third switch contact portion 57 is in contact with the first switch terminal 11 and the third switch terminal 13. This is the state in which SW2 is ON.

Here, if the button 60 is further pressed once again, the rotor 90 will further rotate counterclockwise by 30 degrees, and the cam position will also further rotate by 30 degrees to move. In this way, as shown in FIG. 13 (D), the contacting circular arc cam 96 separates from the bending portion 53, the next circular arc cam 97 presses the bending portion 53, and the pressed third switch contact portion 57 comes into contact with the third switch terminal 13 (refer to FIG. 14 (B)). At this time, the ground contact portion 58 is always in contact with the ground terminal 14, but neither the first switch contact portion 55 nor the second switch contact portion 56 is in contact with the first switch terminal 11 and the second switch terminal 12. This is the state in which SW3 is ON. Finally, if the button 60 is pressed once again, then the rotor 90 will further rotate counterclockwise by 30 degrees and return to the circuit OFF state shown in FIG. 13 (A).

Figure 15:
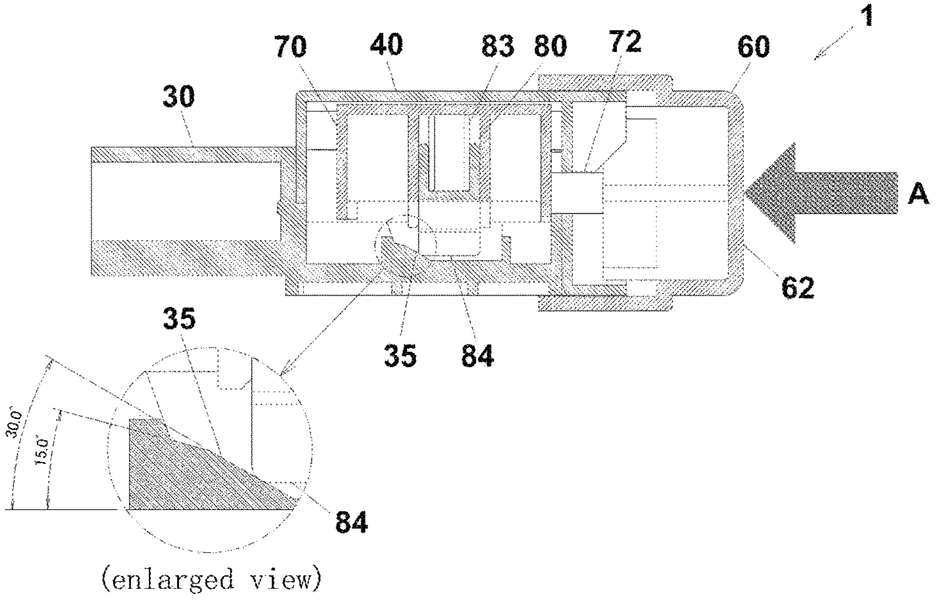
FIG. 15 is an explanatory view showing the relationship between a spring holder and the base in the switch.

Next, the restoring action of the button 60 will be described. As shown in FIG. 15, when the button 60 is in the free position, the coil spring 83 accommodated in the spring holder 80 abuts against the actuator 70 and is compressed, and the click piece 84 is pressed against the base 30 by its rebound force. Here, if the button 60 is pressed in the direction of the arrow A, then the actuator 70 and the spring holder 80 are pressed in, and the click piece 84 climbs up the inclined surface 35 of the base 30 against the spring force of the coil spring 83. As shown in the enlarged view, the initial inclination angle of the inclined surface 35 is 30 degrees, but the inclination angle changes to 15 degrees from midway, therefore when the click piece 84 exceeds the boundary line of the inclination angle, the resistance changes and a clicking sensation is obtained at the fingertip. On the other hand, if the force for pressing the button 60 is released by releasing the finger, then the click piece 84 pressed downward by the spring force of the coil spring 83 will move downward on the inclined surface 35 in the opposite direction, and accordingly the button 60 pressed by the actuator 70 will automatically return to the initial free position.

Figure 16:
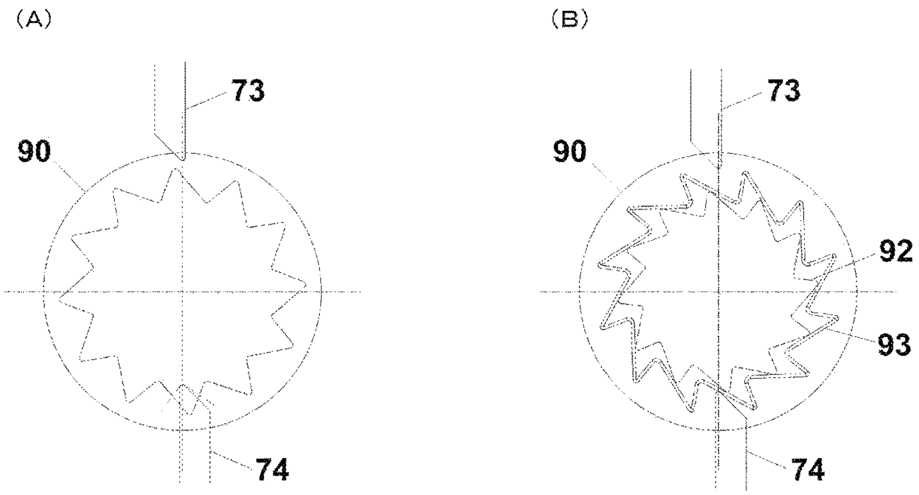
FIG. 16 is an explanatory view showing the reason for forming the gears in the switch as upper and lower two segments.

It should be noted that in the present embodiment, the rotor 90 is provided with the upper gear 92 and the lower gear 93 and the reason for forming the gears in upper and lower two segments is as follows. As shown in FIG. 16 (A), assuming that the gears are formed in a one-segment gear (the number of teeth is 12 and the rotation angle is 15 degrees), the shape of the gear is point-symmetric, so that the position of the lower side protrusion 74 interferes with the rotating gear teeth when in the free position as shown in the figure. In order to avoid the situation, the rotor 90 must be in a state of further rotation of 15 degrees at the position of the lower side protrusion 74. Therefore, in the present embodiment, as shown in FIG. 16 (B), the gears of the rotor 90 are formed in upper and lower two segments with different rotation radii so that the positions of the gear teeth displaces in the circumferential direction (rotation direction), thereby preventing interference between the gear teeth at the 180-degree opposite position and the protrusion when the button 60 is pressed in and automatically restores.

Figure 17:
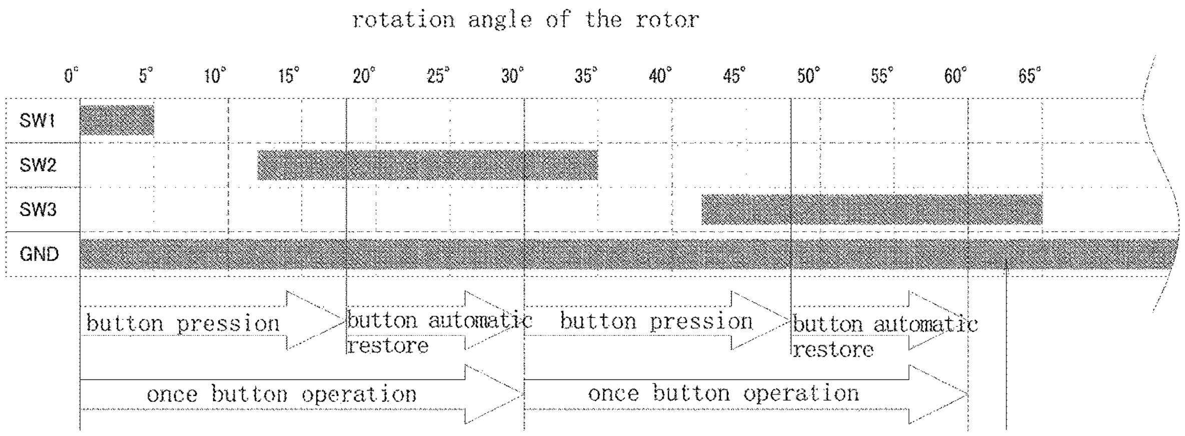
FIG. 17 is an explanatory view showing switching timing of respective circuits in the switch.

In addition, in the present embodiment, the pressure angle of the upper gear 92 is set to 18 degrees, and the pressure angle of the lower gear 93 is set to 12 degrees, the reason for the different pressure angle of the upper and lower gears is as follows. In the push button switch 1, every time the button 60 is pressed, the internal circuit is switched in the order of OFF→SW1 ON→SW2 ON→SW3 ON→OFF. FIG. 17 shows the switching timing of respective circuits and represents the part by shading where the contact is ON. As shown in the figure, the switching timing of respective circuits is performed while the button 60 is pressed and respective circuits become OFF during switching of respective circuits. This is because, if the switching timing is narrowed, the accuracy of the components is required. Therefore, the larger rotation angle of the rotor 90 at the time when the button 60 is pressed, the larger angle required for switching and thus the more favorable it is, therefore the rotation angle at the time of pressing in is set to be larger than that at the time of automatic restoring (18 degrees at the time of pressing in and 12 degrees at the time of automatic restoring).

In the present embodiments described above, the number of ON/OFF contacts of the circuit is set to 3 (SW1, SW2, SW3), but the number of contacts is not limited thereto. For example, by increasing the number of switch terminals of the fixed contact pattern 10, the number of contact portions of the movable contact brush 50, and the number of circular arc cams of the rotor 90, the number of ON/OFF contacts may also be set to 4 or more (SW1, SW2, SW3, SW4, . . . ). That is the present invention is not limited to the above-described embodiments and may be appropriately modified within the scope of the technical idea of the present invention according to the general creative ability of those skilled in the art.

A LIST OF REFERENCE NUMBERS

1: push button switch
2: case
3: operation body
10: fixed contact pattern
11: first switch terminal
12: second switch terminal
13: third switch terminal
14: ground terminal
20: print substrate
21: substrate
22: LED
23: resistance
30: base
31: base body
32: locking claw
33: circular base
34: shaft portion
35: inclined surface
40: top case
41: top plate
42: side plate
43: locking claw
44: mounting piece
45: locking hole
50: moveable contact brush
51: metal plate
52: leaf spring piece
53: bending portion
54: contact portion
55: first switch contact portion
56: second switch contact portion
57: third switch contact portion
58: ground contact portion
60: button
61: button body
62: operation portion
63: locking hole
64: concave portion
70: actuator
71: actuator body
72: convex portion
73: upper side protrusion
74: lower side protrusion
80: spring holder
81: holder body
82: accommodating portion
83: coil spring
84: click piece
90: rotor
91: rotor body
92: upper gear
93: lower gear
94: bearing
95: circular arc cam

96: circular arc cam

97: circular arc cam

98: circular arc cam

What is claimed is:

1. A push button switch comprising: a base having a plurality of terminals arranged separately from each other on a same circumference; a movable contact brush having a plurality of contact portions arranged on the plurality of terminals; a rotor having cams that bring the plurality of contact portions into contact with or separate from the plurality of terminals, and is supported to be capable of rotating about an axis of the base; an actuator that abuts against a gear provided on the rotor and moves in a direction orthogonal to the axis of the base to rotate the rotor; and a button that abuts against the actuator, moves the actuator by a press-in operation, and restores elastically by a spring force; wherein a mechanism for elastically restoring the button is configured to include: an inclined surface that is arranged in the base; and a spring holder that accommodates a coil spring compressed by the actuator and is pressed against the inclined surface by a rebound force of the coil spring.

2. The push button switch according to claim 1, wherein a mechanism for rotating the rotor by the actuator is configured to include:

an upper side protrusion and a lower side protrusion arranged opposite to each other in the actuator; and an upper gear and a lower gear which are laminated in upper and lower two segments in the rotor, and abutted against by the upper side protrusion and the lower side protrusion respectively, wherein a rotation radius of the upper gear and a rotation radius of the lower gear are different, and gear teeth of the upper gear and the lower gear are arranged at positions displaced from each other in the direction of rotation.

* * * * *